Dec. 27, 1966   J. R. MICHAEL ETAL   3,294,573
METHOD FOR COATING PIPE
Filed March 25, 1963   3 Sheets-Sheet 1

EFFECT OF TEMPERATURE IN THE 2ND CURING OVEN ON THE COATING HARDNESS

Inventors,
James R. Michael
Stephen A. Yuhas, Jr.
Donald F. Koenecke
Ober C. Slotterbeck, Deceased,
BY Lealia G. Slotterbeck, Administratrix By C. D. Stores
Patent Attorney Dec. 27, 1966 J. R. MICHAEL ET AL 3,294,573
METHOD FOR COATING PIPE
Filed March 25, 1963 3 Sheets-Sheet 2
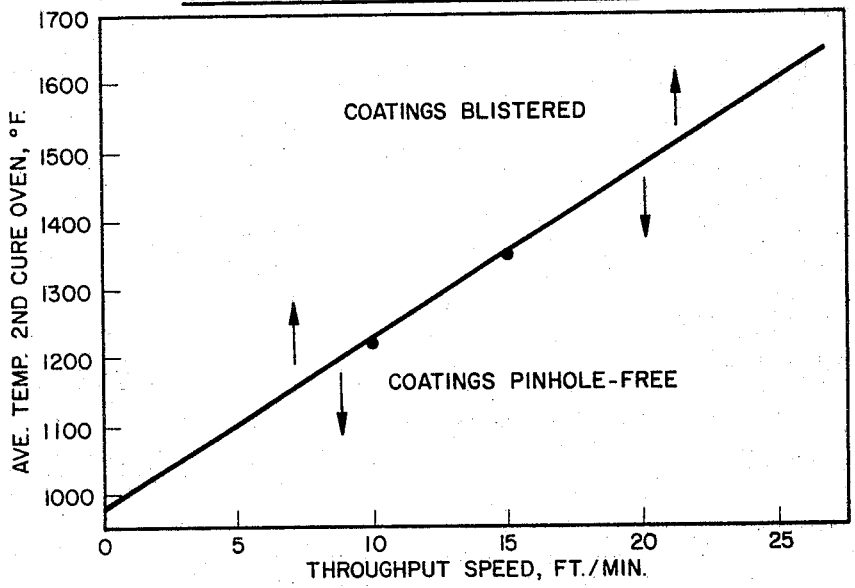
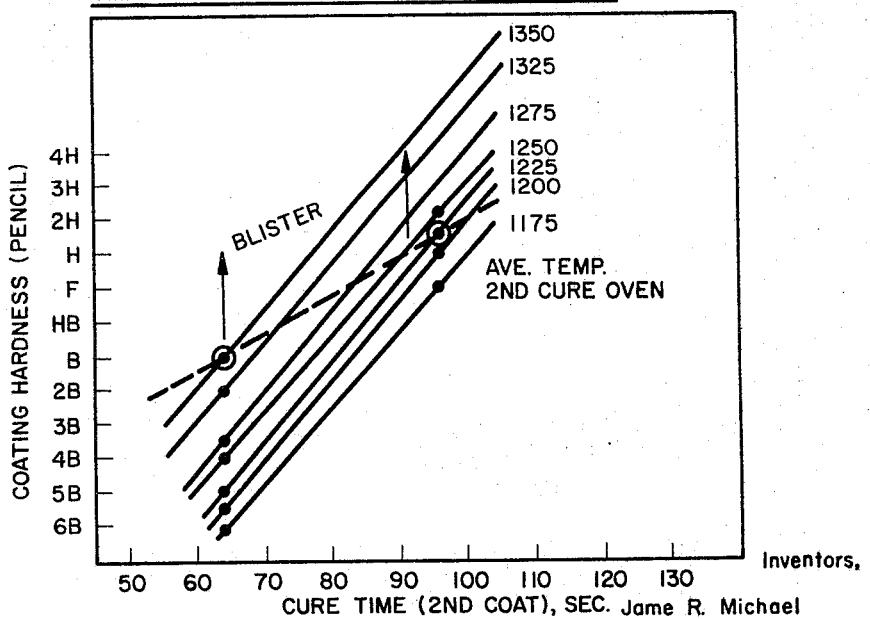
Inventors,
Jame R. Michael
Stephen A. Yuhas, Jr.
Donald F. Koenecke
Ober C. Slotterbeck, Deceased,
BY Lealia G. Slotterbeck, Administratrix
By C.D. Stores
Patent Attorney Dec. 27, 1966 J. R. MICHAEL ETAL 3,294,573
METHOD FOR COATING PIPE Filed March 25, 1963 3 Sheets-Sheet 3

Jame R. Michael
Stephen A. Yuhas, Jr.
Donald F. Koenecke
Ober C. Slotterbeck, Deceased,
BY Lealia G. Slotterbeck, Administratrix Inventors, By C. D. Stores Patent Attorney

3,294,573
METHOD FOR COATING PIPE
James R. Michael, Roselle, Stephen A. Yuhas, Jr., Perth Amboy, and Donald F. Koenecke, Westfield, N.J., and Ober C. Slotterbeck, deceased, late of Rahway, N.J., by Lealia G. Slotterbeck, administratrix, Rahway, N.J., assignors to Esso Research and Engineering Company, a corporation of Delaware
Filed Mar. 25, 1963, Ser. No. 267,862
4 Claims. (Cl. 117—49)

This invention relates to the application of protective coatings to metal articles and in particular to a method and apparatus for continuously coating the outside of a pipe or rod with a layer of a thermosetting polydiolefin resin.

Numerous methods have been used for protecting metal pipe from corrosion but all are subject to certain objections such as high cost, failure of the coating and difficulties in manipulation or handling.

The present invention provides a method and apparatus whereby a plurality of 4–8 mil coatings of a polydiolefin resin can be applied to pipe and cured thereon in a continuous, once-through operation at a speed of 5 to 25 ft. per minute. In a preferred embodiment of the invention the pipe, supported by a pair of steel or rubber wheels which rotate the pipe as it is moved forward, is preheated to a pipe temperature of 250–300° F. after which a coating is applied while the pipe is still hot. The coating is then cured on the pipe at a temperature of 300–3000° F. As soon as the cure is complete, the temperature is reduced by quenching with water. The sequence is then repeated as many times as necessary until the desired number of coatings have been applied. It is also within the scope of this invention to pass the pipes transversely through the ovens, the pipe being supported by mandrels or rods placed in the ends of the pipe or by other means. It may also be desirable to employ a combination in which the pipe is passed lengthwise through some of the ovens and transversely through the others.

Figure 1:
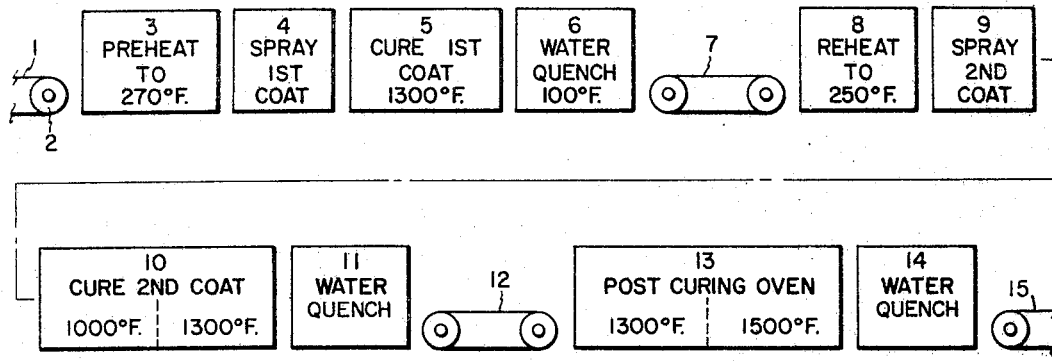
Figure 2:
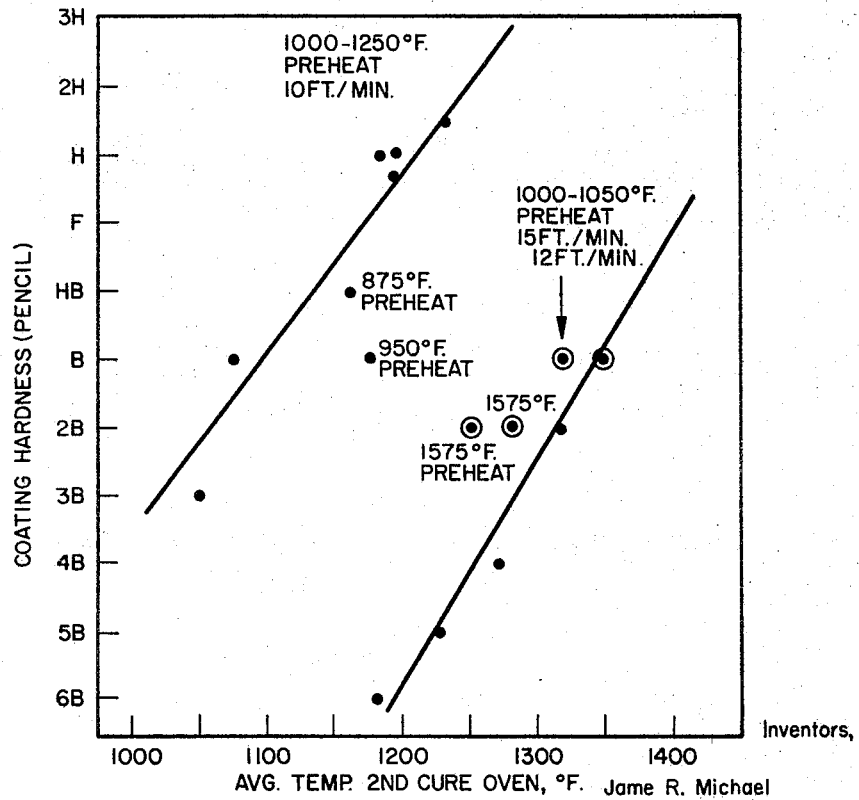
Figure 5:
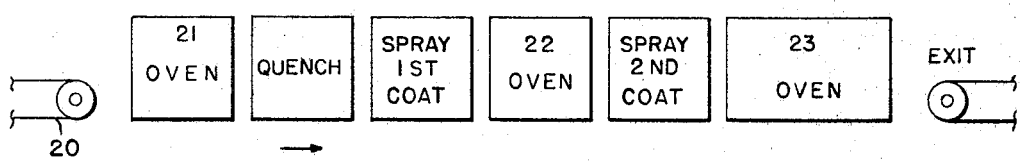

A complete understanding of the invention may be obtained from the following detailed description and explanation which refer to the accompanying drawings illustrating the present preferred embodiment in which, FIGURE 1 is a diagrammatic view of apparatus for coating pipe by the method of this invention;

FIGURE 2 shows the effect of temperature in the second curing oven on the coating hardness;

FIGURE 3 gives the appearance of the coating as a function of the second oven temperature and thruput speed;

FIGURE 4 shows the effect of hardness and appearance as a function of cure time and temperature; and FIGURE 5 is a diagrammatic view of apparatus for coating pipe by an alternative method.

Referring now in detail to FIGURE 1, metal pipe 1, generally in 40 ft. lengths, after being cleaned by sandblasting, shot blasting, wire brushing or by any other suitable method to remove rust, dirt, mill scale and shop coatings, is placed on wheels 2 mounted on tracks (not shown). These wheels rotate the pipe as it is moved forward at a speed of 5–25 ft./minute. Two or more pipes may be mounted in parallel if desired. The pipe is passed first into preheat oven 3 maintained at a temperature of 500–3500° F., preferably 1000–2200° F. The preheat oven is suitably a fire-brick lined oven, heated by oil, gas, or other means. From the preheat oven the pipe at a temperature of 250–280° F., e.g., 270° F., is advanced beyond the track and passes unsupported through spraying zone 4 wherein a coating of a solution of a polydiolefin is applied to the surface of the pipe as by spraying, brushing or by any other means that will give a thin uniform coating.

The polydiolefin used in accordance with this invention may be an airblown polymer of 50 to 100 parts of butadiene-1,3 and about 50 to 0 parts of styrene. The polydiolefins are prepared by alkali metal catalysis as described in U.S. patent to Jaros et al., No. 2,849,510, issued August 26, 1958 (incorporated herein by reference), or by mass polymerization in presence of a hydrocarbon soluble peroxide catalyst, such as benzoyl peroxide or cumene hydroperoxide as described in U.S. Patent No. 2,586,594, to Arundale (also incorporated herein by reference) or by emulsion polymerization as described in U.S. Patent No. 2,500,983 to Frolich (also incorporated by reference). The products so obtained are then oxidized by blowing with air, or other free oxygen-containing gases or epoxidized by reacting with a per-acid or other compound capable of yielding oxygen in situ. The air blowing is preferably carried out at a temperature in the range of 150 to 300° F., preferably in the presence of 0.01 to 0.1 wt. percent of Mn, Co, Fe soaps as oxidation catalysts, and for a time sufficient to incorporate 10 to 20 wt. percent oxygen in the oily polymer. As a practical matter these airblown oils are prepared in two grades, one containing 10% oxygen and the other 16% oxygen.

The epoxidation of the polydiolefins is suitably carried out by dissolving the polymer in a hydrocarbon solvent such as normal heptane, benzene, chloroform, ethyl chloride or the like and adding the resulting solution to a solution of the oxidizing agent, e.g., the per-acids ($R$—$COO_2H$) or their salts, or hydroperoxides. The per-acids include peracetic and perbenzoic and the like. The epoxidation reaction is carried out at a temperature of 0–95° C., preferably 20–50° C., and for a time between 1 and 60 hours, preferably 6 to 30 hours. The mole ratio of $C_4$ units contained in the liquid polymer to per-acid in the process may vary from 1:1 to 4:1, preferably 2:1 to 3:1. The resulting product contains from 1 to 9.5 wt. percent epoxide. This process is described in detail in U.S. Patent No. 2,842,513 which is incorporated herein by reference.

When epoxidized polymers are used it is preferable to mix them with curing aids and crosslinking agents. A suitable mixture is as follows:

| | Parts by wt. |
|---|---|
| Epoxidized polymer | 100 |
| Maleic anhydride | 30–35 |
| Propylene glycol | 5–10 |
| Dicumyl peroxide | 0.5–1 |

An alternate curable mix can be prepared from the following recipe.

| | Parts by wt. |
|---|---|
| Epoxidized polymer | 100 |
| Phenol | 2–10 |
| Triethylene tetra amine | 5–15 |

In accordance with one aspect of this invention, it has been found that oils containing 10 to 16 wt. percent oxygen are satisfactory, but oils containing from 13 to 16% oxygen are preferred since such oils given harder coatings than the oils containing 10% oxygen when cured under same conditions of time and temperature. If desired the preferred coatings useful in this invention may be composed of a mixture of the oils containing 10% oxygen and those containing 16% oxygen in the ratio of 50:50 to 0:100 to give composite oxygen contents of 10 to 16% or the higher oxygen-content oils may be mixed with non-oxidized polymer oils to yield the desired oxygen content polymer. It is also within the scope of this invention to use oils synthesized directly to the oxygen content desired. These oils are dissolved in sufficient hydrocarbon solvent to give a solution of 40 to 60 wt. percent. An alcohol, such as isopropyl alcohol, may be added in lieu of part of the hydrocarbon solvent to improve solubility of the oxygenated polymer and to give storage stability to the solution. In the absence of the alcohol the solution thickens but remains usable for a period of up to six months. The solvent may be any aliphatic or aromatic hydrocarbon solvent with which the oil is compatible. The resulting solution has a specific gravity of .913 to .925, a viscosity of 1.6 to 3.5 poises, a Gardner color of 7 to 10, an acid number of 10 to 16 and a refractive index of about 1.5. If desired other resins such as urea, urea-formaldehyde, melamine or melamine-formaldehyde resins may be added in any desired proportions, e.g., up to 40% based on polydiolefin. Small amounts up to about 20% of unoxidized polybutadiene resins prepared as described above may be added especially when the oxidized polybutadiene contains high amounts of oxygen.

The coated pipe is passed next through cure oven 5, maintained at a temperature of 1200–1600° F. This oven is suitably a fire-brick lined oven similar to the preheat oven 3. The coated pipe remains in this oven for a period of 40 to 120 seconds. The pipe leaves oven 5 at a temperature 350–510° F. and is cooled by a stream of water in quencher 6 to a temperature of 60–150° F., preferably 100° F. This sets the coating so that it will not be damaged by subsequent contact with conveying equipment 7 consisting of a series of rubber wheels which transports the pipe to reheat oven 8, maintained at a gas temperature of 700–2000° F. which heats the pipe to about 250° F. Reheat oven 8 is suitably an oven lined with ceramic fiber or brick and heated by two simple oil or gas burners. The pipe leaves this oven at a temperature of 150–500° F., preferably 201–260° F., usually about 250° F., and is again covered with a second coating of polydiolefin polymer in coating zone. This coating may be the same as or different from the first coating. Following this it is passed to a second cure oven 10 maintained at a temperature of 750–1425° F. Average temperature in the first two-thirds of the oven is about 1000° F. and in the final third it is about 1300° F. Pipe temperature midway of oven 10 is about 370° F. This second cure oven is similar to the reheat oven 8 except that it is longer to provide a longer coating contact time, is lined with ceramic fiber or brick, and heated by four simple oil or gas burners. Coating contact time in this oven is 32 to 96 seconds in each temperature zone. The pipe leaves this oven at a temperature of 350–550° F. and is cooled to 60–150° F., preferably 100° F., by water in quencher 11, from which the pipe is conveyed by rubber wheels. At this point, if the contact time has been too short in the curing ovens, the coating is apt to be too soft. For that reason the coating is preferably passed through post curing oven 13 which for most purposes is longer than either oven 5 or oven 10. The gas temperature is oven 13 ranges from an average of about 1300° F. in the first half to an average of 1500° F. in the second half.

Following oven 13 the pipe at a temperature of 430–540° F. is passed through water quench zone 14. Following quencher 14 the pipe is wrapped with kraft paper or other wrappings and moved to storage. The coating thus obtained ranges in hardness from HB to 3H and has a direct impact strength greater than 20 in. lb. If desired the number of coatings and consequently the number of curing ovens may be increased, so that coatings of any desired thickness can be obtained.

Thus, the coating may be applied in three coats to obtain a greater total film thickness. Three coats can be applied in succession in a continuous, once through operation similar to that described in FIGURE 1. Immediately following quencher 14 and conveying equipment 15, there would be provided an additional preheat oven, spray equipment, curing oven, quencher, and conveying equipment in that order. The gas temperature in the added curing oven varies from 1000° F. at the entrance to 1300° F. at the exit.

Another type of apparatus for the application and curing of resins previously described is one in which the pipe is conveyed through the various steps in a transverse direction rather than in a longitudinal direction. This method permits a higher rate (ft./min.) of production of high quality resin coated pipe than the longitudinal method. The following description of the apparatus and its operation will serve to make clear the manner in which it is used.

Referring, therefore, to FIGURE 5, steel pipe previously cleaned by shotblasting, etc., is placed on conveyor 20 which supports the pipe at both ends and conveys it through the subsequent steps in a transverse position, i.e., the length of the pipe is at right angles to its direction of travel. In this manner the pipe is conveyed through oven 21 at a forward rate of 0.5 to 10 ft./min. and subjected to an oven temperature of from 250°–1200° F. The rate of forward travel, oven temperature, and length of oven being so regulated as to produce in the pipe a temperature of 250–280° F. as it exits from the oven. The preheated pipe as it exits from oven 21 is given a rotary motion around its longitudinal axis of from 3 to 20 r.p.m. and at the same time is subjected to a spray of resin from suitable spray equipment (not shown) in such manner as to produce a uniform wet coating of resin which will yield from 1.5 to 3.5 mils, preferably 3.0 mils, of film when cured.

The rotary motion of the pipe is continued as it passes into oven 22 and until the resin has set to a consistency which will not "sag" when the rotary motion is stopped. The temperature in oven 22 is maintained at from 250° F. to 1200° F. in such manner as to provide a temperature gradient in the direction of the forward movement of the pipe. The temperature, forward movement of pipe and oven length being regulated so as to produce in the coated pipe emerging from oven 22 a coating that is essentially free of solvent and at a temperature of from 350–500° F. The coated pipe is then allowed to cool, or is cooled in some manner, to 220–250° F. At this point a second coating of approximately 3 mils dry resin is applied in a similar manner to the first coating. The multi-coated pipe then passes into oven 23 where it is subjected to oven temperatures of from 250° F.–2500° F. The temperatures in oven 23 are maintained to provide a temperature gradient from entrance to exit of the oven so that the multi-coated pipe first is subjected to the lower temperature and then to higher temperatures as it progresses through the oven. The conditions of forward travel, temperature, and oven size are regulated to provide that the surface of the pipe does not exceed 550° F. but cures to a condition that yields a coating hardness of at least 2H pencil.

The following examples are presented to illustrate the invention in more complete detail, but it is not intended to limit the inventive concepts strictly thereto.

*Example 1*

A solution in Solvesso 100 (an aromatic hydrocarbon fraction boiling 156°–177° C. having a Kauri-butanol value of 98–100) of a butadiene-styrene copolymer oil made in accordance with the following recipe:

| | Parts by wt. |
|---|---|
| Butadiene-1,3 | 80 |
| Styrene | 20 |
| Straight-run mineral spirits [1] | 200 |
| Dioxane | 40 |
| Isopropanol | 0.2 |
| Sodium catalyst | 1.5 |
| Temperature, 50° C. | |

[1] Boiling 150°–200° C.

was blown with air at a temperature of about 50°–60° C. in the presence of about 1 p.p.m. manganese naphthenate dissolved in Solvesso 100 until about 10% oxygen had been incorporated. The polymer was stripped to 62% NVM and 12% of isopropyl alcohol was added (Polymer A). A second sample was blown in xylene until about 16% oxygen had been incorporated. It was then stripped to 65% NVM and 20% of isopropyl alcohol added (Polymer B).

*Example 2*

A blend of three parts by weight of the oxidized polymer (B) of Example 1 with one part of the oxidized polymer (A) was prepared and used to coat 4" dia., schedule 40 steel pipe in a continuous once through operation similar to that described above except that no post cure oven was used and the effect of pipe speed and temperature of the pipe in the second preheat and cure ovens on appearance and hardness of the coatings determined. The data obtained are shown in the following table and in FIGURES 2, 3, and 4.

TABLE I.—POLYMER PIPE COATING DATA

| Speed, ft./min. | Coating Hardness [a] | 2d Preheat Temperature,° F. [b] | 2d Cure Temp. (Avg.), ° F. | Appearance |
|---|---|---|---|---|
| 10 | | 1,150 | 1,300 | Blisters. |
| 10 | H–2H | 1,050 | 1,235 | Good. |
| 10 | H | 1,175 | 1,190 | Do. |
| 10 | H | 1,250 | 1,180 | Few blisters. |
| 10 | HB | 875 | 1,165 | Good. |
| 10 | B | 950 | 1,175 | Do. |
| 10 | B | 1,100 | 1,080 | Do. |
| 10 | 3B | 1,175 | 1,050 | Do. |
| 12 | B | 1,050 | 1,320 | Few blisters. |
| 15 | | 1,800 | 1,415 | Blisters. |
| 15 | | 1,200 | 1,365 | Do. |
| 15 | B | 1,025 | 1,340 | Do. |
| 15 | 2B | 1,525 | 1,285 | Few blisters. |
| 15 | 2B | 1,575 | 1,250 | Do. |
| 15 | 2B | 1,025 | 1,310 | Good. |
| 15 | 4B | 1,050 | 1,270 | Do. |
| 15 | 5B | 1,050 | 1,220 | Do. |
| 15 | 6B | 1,000 | 1,180 | Do. |

[a] Coating hardness: softest 6B, 5B ... B, HB, F, H ... 7H hardest.
[b] Coatings will blister if the pipe temperature exceeds 260° F. during application of the second coat; or if it exceeds 300° F. during application of the second coat; or if it exceeds 300° F. during application of the first coat.

The data in the above table and in FIGURES 2 and 3 show: (a) that the hardness increases directly as the average temperature in the second preheat oven and in the second curing oven increase and decreases as the throughput speed of the unit increases.

(b) The coatings are pin-hole free if the temperature of the pipe leaving the first and second preheat ovens are kept below 300° F. and 260° F., respectively.

(c) The coatings blister if the average temperature of the second curing oven is too high. This temperature is dependent upon the coating speed and varies from 1100° F. at 5 ft. per minute to 1600° F. at 25 ft./minute.

(d) The coating hardness and appearance is dependent upon the cure time (FIGURE 4). The time required to cure the coating to a 2H hardness is dependent upon the average temperature in the second curing oven. Furthermore, the appearance, whether pinholed or blistered, of the coating can be determined for any particular combination of cure time and temperature.

*Example 3*

Various mixtures of the oxidized polymers A and B of Example 1 were used as coating compositions for pipe and tested in laboratory equipment in which the coatings were cured by rotating the coated pipe in front of an acetylene burner. The data are reported in Table II.

TABLE II.—FLAME-CURED POLYDIOLEFIN COATINGS

| Percent Polymer A | Percent Polymer B | Coats | Cure,[a] min. | Thickness, mils | Pencil Hardness |
|---|---|---|---|---|---|
| 100 | | 1 | 2 | 2.5 | 2B. |
| 90 | 10 | 1 | 2 | 2.5 | 2B. |
| 75 | 25 | 1 | 2 | 2.5 | 2B. |
| 50 | 50 | 1 | 2 | 2.5 | B. |
| 25 | 75 | 1 | 2 | 2.0–2.5 | HB ⎤ |
| 20 | 80 | 1 | 2 | 2.0–2.5 | HB ⎬ Hard. |
| | 100 | 1 | 2 | 2.5 | HB ⎦ |
| 100 | | 2 | 3 | 5.0 | 4B. |
| 90 | 10 | 2 | 3 | 6.5 | 6B Soft. |
| 75 | 25 | 2 | 3 | 5.0 | 4B. |
| 50 | 50 | 2 | 3 | 5.5 | 3B. |
| 25 | 75 | 2 | 3 | 5.3 | B. |
| 20 | 80 | 2 | 3 | 4.5 | HB ⎤ Hard.[b] |
| | 100 | 2 | 3 | 5.0 | HB ⎦ |

[a] Cure time in minutes of final coat. All first coats were cured for 2 minutes.
[b] Tendency to blister.

The above data show that a mixture of from 25% polymer (A) to 75% polymer (B) to 0% polymer (A) to 100% polymer (B) gave the hardest coating.

*Example 4*

Experiment 3 was repeated and the coated pipe was tested in a plant scheme similar to that described in FIGURE 1 except no post cure oven was used. The data are reported in Table III.

TABLE III.—POLYDIOLEFIN COATINGS APPLIED WITH POLYMER PIPE COATING PLANT[d]

| Percent Polymer A | Percent Polymer B | Coats | Time in Oven (sec.) | Speed [a] | Thickness, mils | Hardness [b] | Appearance |
|---|---|---|---|---|---|---|---|
| 100 | | 1 | 56 | 15 | 2.5 | 2B | Good. |
| 100 | | 1 | 32 | 15 | 2.5 | 5B | Do. |
| 100 | | 2 | 56 | 15 | 5.0 | 2B | Do. |
| | 100 | 1 | 56 | 15 | 2.5 | HB–H | Do. |
| | 100 | 1 | 32 | 15 | 2.5 | B | Do. |
| | 100 | 2 | 56 | 15 | | | Blistered.[c] |
| | 100 | 1 | 70 | 12 | 2.5 | H–2H | Good. |
| 25 | 75 | 1 | 70 | 12 | 2.0 | H | Do. |
| 25 | 75 | 2 | 70 | 12 | 5.0 | HB | Do. |

[a] Coating speed in ft./min.
[b] Pencil hardness: softest 6B, 5B ... 2B, B, HB, F. H, 2H ... 7H hardest.
[c] When Polymer B alone was applied as a second coat, it blistered under all curing conditions.
[d] Data were obtained by coating 4" dia., schedule 40 steel pipe.

The data in Table III confirms the results obtained in Example 3.

Example 5

The experiment of Example 2 was repeated in the continuous once through operation described in FIGURE 1 including the post cure oven. The results are shown in Table IV.

TABLE IV

| Speed (ft./min.) | Pipe Temp. (° F.) at (a) | Pipe Temp. (° F.) at (b) | Coating Hardness at (b) | Pipe Temp. (° F.) at (c) | Pipe Temp. (° F.) at (d) | Pipe Temp. (° F.) at (e) | Coating Hardness at (e) | Pipe Temp. (° F.) at (f) | Pipe Temp. (° F.) at (g) | Coating Hardness at (h) | Remarks |
|---|---|---|---|---|---|---|---|---|---|---|---|
| 5 | 510 | 100 | F | 370 | 550 | 100 | 2H | | | | No postcuring reqd. |
| 10 | 390 | 100 | B to HB | 310 | 420 | 150 | HB to F | 360 | 480 | 3H | All curing oven temperatures raised 100° F. |
| 10 | 410 | 100 | HB | 330 | 470 | 150 | H | 410 | 540 | 2H to 3H | |
| 15 | 350 | 100 | 2B to B | 295 | 370 | 150 | 3B to 2B | 310 | 410 | HB to F | Do. |
| 15 | 380 | 100 | B | 310 | 410 | 150 | 2B to B | 330 | 430 | F to H | |

Pencil Hardness: Softest pencil that will cut film. Softest 6B, 5B . . . 2B, B, HB, F, H, 2H . . . 7H hardest.
(a) Exit from oven 5.
(b) Exit from quench 6.
(c) Midway of oven 10.
(d) Exit from oven 10.
(e) Exit from quench 11.
(f) Two-thirds through oven 13.
(g) Exit from oven 13.
(h) Exit from quench 14.

The above data show how the use of a post cure oven enables good coatings to be obtained at higher coating speed. Without a post curing oven satisfactorily hard coatings can be had at pipe speeds no greater than 5 ft. per min. When the post curing oven is used speeds of at least 12 ft. per minute may be used and hard coatings obtained.

Example 6

The experiment of Example 2 was repeated using as the coating an epoxidized polybutadiene resin alone (A) or in the following Formulation B:

| | Parts by wt.[a] |
|---|---|
| Epoxidized polybutadiene | 100 |
| Maleic anhydride | 35 |
| Propylene glycol | 6 |
| Vinylcyclohexene dioxide | 28 |

[a] Prepared as described above.

The results of one-coat coatings baked under the conditions described in equipment 3 through 6 in FIGURE 1 are shown in Table V.

TABLE V

| Formulation | Curing Temp., ° F. | Curing Time, sec. | Coating Thickness, mils | Pencil Hardness | Remarks |
|---|---|---|---|---|---|
| (A) | 1,000 | 120 | 22 | 2B | Tacky. |
| (A) | 1,000 | 180 | 22 | HB | Wrinkled surface indicates surface curing. |
| (A) | 1,300 | 120 | 22 | 6H | Same as above. |
| (B) | 1,000 | 180 | 1.3 | F | Good. |
| (B) | 1,000 | 240 | 1.5 | 3H | Good. |
| (B) | 1,300 | 120 | 1.4 | 2H | Sl. wrinkled. |
| (B) | 1,500 | 120 | 1.5 | 4H | Wrinkled surface. |

The advantages of this invention are several, and while they will accrue to metal articles generally which require protection against corrosion, they have particular significance in the case of petroleum carrying pipelines intended for underground installation.

While one embodiment of this invention has been illustrated and described with considerable particularity, it is not intended that it be limited thereto or to the carrying out of this method by the use of apparatus of that character alone, since it will be evident that various changes may be made in the details thereof, if desired, without departing from its principal features and characteristics. For example, while FIGURE 1 has been described showing the use of only two curing ovens, it is intended that as many curing ovens may be used as desired, depending, of course, on the number of coatings to be applied. In those cases in which more than two coatings are applied, it is to be understood that the conditions employed for curing the final coating are the same as those given for the second coating in describing FIGURE 1, the conditions for curing all the other coatings being the same as for the first coating of FIGURE 1. Also the pilot plant data described above on curing oven temperatures were obtained using 4" dia., schedule 40 steel pipe. The best oven temperatures may be different for other pipe sizes and pipe wall thicknesses. However, the desired pipe temperatures would remain the same. It is also to be understood that in each of the curing ovens, e.g., 5, 10, 13, etc., the flame from the burning gases may play directly upon the coated pipe.

It is also to be understood that while the pipe has been described as being supported by steel or rubber wheels, other means of support may be used. For example, the pipe may be supported by magnets or by columns of compressed air.

The nature of the present invention having been thus fully set forth and specific examples of the same given, what is claimed as new and useful and desired to be secured by Letters Patent is:

1. A continuous method of applying a coating for the purpose of protecting a metal article against corrosion comprising:

continuously passing said metal article through a plurality of treating zones comprising the following successive steps:
 (a) preheating said article to a temperature of 250–280° F.;
 (b) applying at least one protective coat to said preheated article, said coating comprising an oxygenated polymer of 50 to 100 parts by weight of butadiene-1,3 and about 50 to 0 parts of styrene, containing 10 to 20 wt. percent oxygen;
 (c) effecting partial cure of each of said protective coats by passing said freshly coated article through a heating zone maintained at a temperature of 1200–1600° F. for a contact time of 40–120 sec. so that the temperature of the coated article reaches 400–500° F.;
(d) cooling each of said partially cured coatings to 60–150° F.;
(e) reheating said coated article to a temperature of 210–250° F.;
(f) applying final protective coats to said reheated article consisting essentially of the same composition as said first coat;
(g) effecting a complete cure of all of said coats by passing said article through a final curing zone;
(h) maintaining an average gas temperature in the first two-thirds of said final curing zone of about 1000° F. and in the final third of said final curing zone of about 1300° F.;
(i) maintaining said article in said first two-thirds of said final curing zone for about 32 to 96 seconds and in said final third of said curing zone for about 32 to 96 seconds so that the temperature of the coated article gradually reaches 450–550° F., but does not exceed, 550° F.;
(j) and storing said coated article.

2. Process according to claim 1 in which the metal article is covered with three protective coats.

3. Process according to claim 1 in which the coating has the following composition:

| | Parts by wt. |
|---|---|
| Epoxidized polybutadiene | 100 |
| Maleic anhydride | 30–35 |
| Propylene glycol | 5–10 |

4. A continuous method of applying a coating for the purpose of protecting a metal article against corrosion comprising:
continuously passing said metal article through a plurality of treating zones comprising the following successive steps:
(a) preheating said article to a temperature of 250–280° F.;
(b) applying a first protective coat to said preheated article, said coat comprising an oxygenated polymer of 50 to 100 parts by weight of butadiene-1,3 and about 50 to 0 parts of styrene, containing 10 to 20 wt. percent oxygen;
(c) effecting partial cure of said first protective coat by passing said article through a first curing zone maintained at a temperature of 1200–1600° F. for a contact time of 40 to 120 sec. so that the temperature of the coated article reaches 400–500° F.;
(d) cooling said partially cured coating to 60–150° F.;
(e) reheating said coated article to a temperature of 210–250° F.;
(f) applying a second protective coat to said reheated article consisting essentially of the same composition as said first coat;
(g) effecting a complete cure of both of said coats by passing said article through a second curing zone;
(h) maintaining an average gas temperature in the first two-thirds of said second curing zone of about 1000° F. and in the final third of said second curing zone of about 1300° F.;
(i) maintaining said article in said first two-thirds of said second curing zone for about 32 to 96 seconds and in said final third of said curing zone for about 32 to 96 seconds so that the temperature of the coated article reaches 450–550° F., but does not exceed, 550° F.;
(j) cooling said cured coating to 60–150° F.;
(k) heating said cooled coating to a temperature of 430–540° F. for a period of 60 to 300 sec.;
(l) wrapping and storing said coated article.

References Cited by the Examiner

UNITED STATES PATENTS

| | | | |
|---|---|---|---|
| 2,582,991 | 6/1952 | Hempel | 117—132 |
| 2,768,908 | 10/1956 | Cull | 117—132 |
| 2,963,045 | 12/1960 | Canevari et al. | 117—132 |
| 3,028,257 | 4/1962 | Svrchek et al. | 117—132 |
| 3,081,283 | 3/1963 | Basmajian | 117—132 |
| 3,108,022 | 10/1963 | Church | 118—58 |
| 3,134,688 | 5/1964 | Hempel | 117—132 |

WILLIAM D. MARTIN, *Primary Examiner.*

S. W. ROTHSTEIN, *Assistant Examiner.*